United States Patent
Liang et al.

(10) Patent No.: US 6,301,877 B1
(45) Date of Patent: Oct. 16, 2001

(54) EJECTOR EXTENSION COOLING FOR EXHAUST NOZZLE

(75) Inventors: George P. Liang, Palm City; William J. Yeager, Jupiter, both of FL (US); John F. Soileau, Tullahoma, TN (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 08/556,317

(22) Filed: Nov. 13, 1995

(51) Int. Cl.$^7$ ................. F02K 1/12; F02K 3/04
(52) U.S. Cl. ............ 60/226.1; 60/266; 60/39.5; 239/127.3
(58) Field of Search ............... 60/226.1, 266, 60/262, 271, 39.07, 39.05, 39.83; 239/127.1, 127.3

(56) References Cited

U.S. PATENT DOCUMENTS

| | | | |
|---|---|---|---|
| 4,487,017 | * 12/1984 | Rodgers | 60/262 |
| 4,544,098 | * 10/1985 | Warburton | 239/127.3 |
| 4,621,769 | * 11/1986 | Szuminski | 239/265.39 |
| 4,690,329 | * 9/1987 | Madden | 239/265.19 |
| 5,101,624 | * 4/1992 | Nash et al. | 60/266 |
| 5,255,849 | * 10/1993 | Mayer et al. | 239/127.3 |
| 5,328,098 | * 7/1994 | Barcza et al. | 239/265.35 |
| 5,335,489 | * 8/1994 | Thayer | 60/230 |
| 5,407,133 | * 4/1995 | Liang | 239/127.3 |
| 5,435,127 | * 7/1995 | Luffy et al. | 60/266 |
| 5,577,381 | * 11/1996 | Eigenbrode et al. | 60/226.1 |
| 5,586,431 | * 12/1996 | Thonebe et al. | 60/226.1 |
| 5,593,112 | * 1/1997 | Maier et al. | 244/117 A |

* cited by examiner

*Primary Examiner*—Ted Kim
(74) *Attorney, Agent, or Firm*—Norman Friedland

(57) ABSTRACT

The cooling of the exhaust nozzle of a fan jet engine powering aircraft is enhanced by providing an extension cooling concept that includes an extension piece extending axially downstream of the nozzles variable throat that utilizes fan air to cool the forward portion of the divergent nozzle surfaces adjacent to the gas path of the engine and ram air to cool the surfaces downstream of the ejector. A variable vane varies the area of the ejector slot as a function of Aj for compensating for flow losses at off-design points of the nozzle positions during the flight envelope of the aircraft so as to avoid overtemperature of the components.

14 Claims, 3 Drawing Sheets

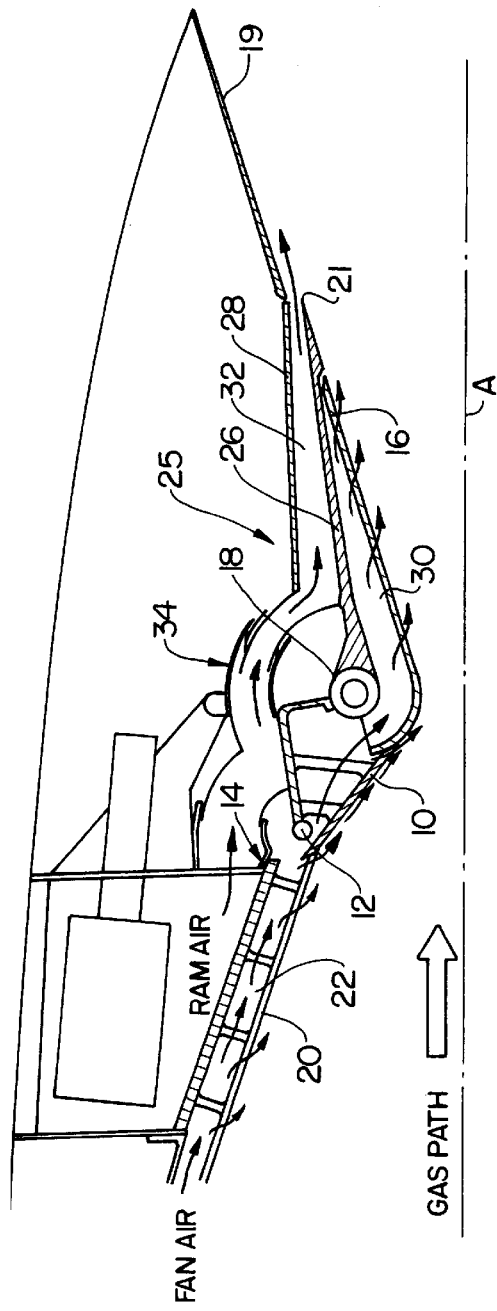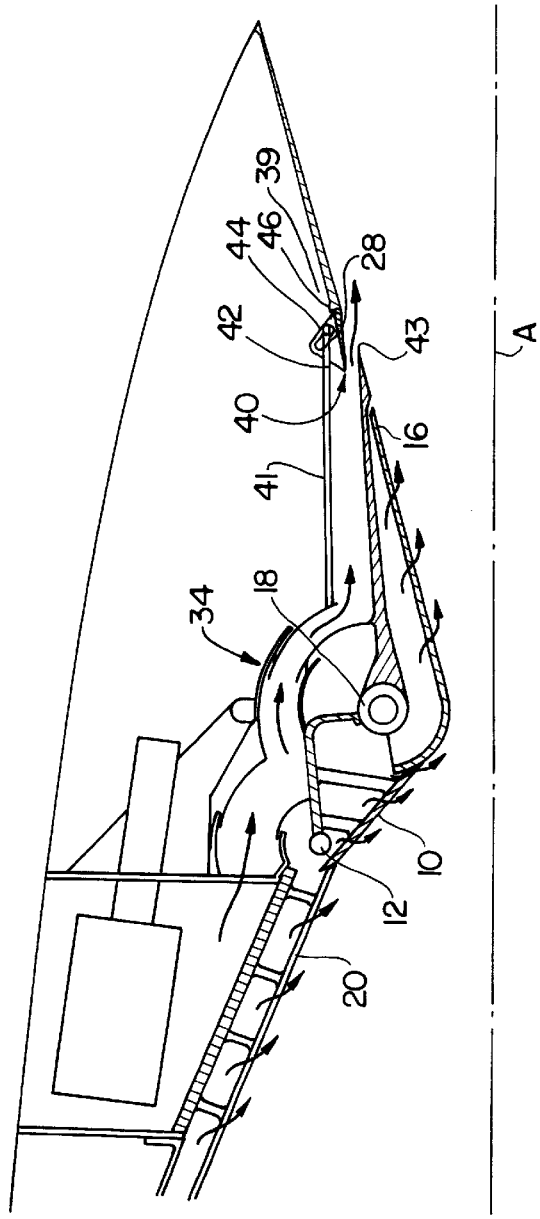

EJECTOR EXTENSION COOLING FOR EXHAUST NOZZLE

CROSS REFERENCES

This invention relates to the contemporaneously filed U.S. Patent Application by co-inventors George P. Liang and John Soileau entitled "Multi-Expansion Ejector Nozzle" Ser. No. 08/559,118 filed Nov. 17, 1995, assigned to United Technologies Corporation the assignee common to this patent application and U.S. Pat. No. 5,335,489 granted to E. B. Thayer on Aug. 9, 1994 entitled "Gas Turbine vectoring Nozzle" and U.S. Pat. No. 4,690,329 granted to W. M. Madden on Sep. 1, 1987, entitled "Exhaust Nozzle Coupled With Reverser Exhaust Door", both of which are commonly assigned to the assignee of this patent application.

This invention was made under a Government contract and the Government has an interest herein.

TECHNICAL FIELD

This invention relates to a system for cooling the side wall and flaps of a variable area nozzle for a gas turbine engine and particularly to a system that includes a cooling extension for an ejector and the option of including means for varying the exit flow of the ejector.

BACKGROUND ART

As is well known in the gas turbine engine technology the modern day fighter aircraft incorporate thrust vectoring nozzles that include variable positioning flaps that direct the engine's exhaust to flow at various attitudes. It is also well known that the throat of the exhaust nozzle is varied from a minimum to a maximum area to accommodate certain fight conditions. The problems that have perplexed the scientists and engineers in this technology is the cooling of the components that are in contact with the hot engine discharge gasses without incurring an intolerable performance deficit.

In heretofore known exhaust nozzles, designs ram air is applied to the hot surface defining the boundary of the gas path of the divergent nozzle by flowing engine ram air through a relatively large ejector slot located adjacent the throat of the exhaust nozzle. While this design intended to distribute film air adjacent the inner surface of the divergent portion of the nozzle, because of the configuration of the ejector which is dictated by the amount of cooling required and hence the amount of cooling air, these systems were not only costly in terms of the amount of cooling air required, but the overall cooling effectiveness was less than satisfactory. In other words the heretofore known designs exhibited the following disadvantages;

1) Cooling air discharges at high gas path pressure region induces high viscous mixing with a consequential reduction in film cooling effectiveness.
2) At high gas path pressure region, the ejector slot has to overcome a high base pressure, resulting in a reduction of pumping efficiency, requires a large slot size and/or in some cases the loss of ejection of cooling air.
3) In a vectoring nozzle application, due to the nozzle throat shifting for the different attitudes of the nozzle, hot gas injection could occur during the vectored mode.

We have found that we can obviate the problems noted above by providing a cooling extension for the ejector of a liner cooling system that allows the low pressure ram air to be discharged further downstream of the nozzle to a lower nozzle pressure region. This produces a lower slot base pressure, enhances pumping capability and reduces slot size requirement. This invention enhances film cooling which is controlled by the supersonic primary stream expansion and recompression characteristics induced by the aft facing ejector slot. The expansion and recompression is minimized when the secondary stream pressure (ram air) is approximately balanced or "matched" with the primary stream (gas path) "approach" static pressure. Matching these pressures creates a co-annular flow situation with little near wall influence from the primary stream and minimal film decay over the cooled length.

Essentially the cooling extension of the ejector cooling system of this invention minimizes turbulent mixing between the streams and hence enhances the pumping, cool film effectiveness and engine thrust. By configuring the slot edge shapes of the cooling extension an improvement in infrared detection is realized.

In certain applications the cooling extension with a fixed ejector slot may present certain problems in that at the off-design points the cooling flowrate capability may not respond to demand. For example, at maximum augmentation in the augmentor of the engine, when the nozzle throat area is increased the cooling slot-to-throat (slot of the ejector and throat of the nozzle) area ratio is reduced, resulting in a reduction of cooling flow pumping capability and film effectiveness level. This has a consequential impact on the temperature and could cause an overtemperature situation in the nozzle with a potential damage or life limiting of the component parts. We have found that we can obviate the problem described in the immediate above paragraph by incorporating a vane cooperating with the ejector slot and being varied as a function of the nozzle throat area (Aj).

SUMMARY OF THE INVENTION

An object of this invention is to provide an improved cooling system for a vectoring nozzle that includes a cooling extension for an ejector.

Another object of this invention is to provide an improved cooling system for a vectoring nozzle that incorporates a variable outlet for an ejector.

A feature of this invention is to provide a cooling extension to the ejector of a liner cooling system that discharges the film cooling air downstream of the throat of the convergent/divergent vectoring nozzle.

A still further feature of this invention is to provide a flap cooperating with the exit area of the ejector of a nozzle cooling system that synchronously adjusts the exit area in conjunction with varying the throat on the nozzle.

Another feature of this invention is to configure the end of the cooling extension of the ejector to define a single or multiple node configuration.

The foregoing and other features of the present invention will become more apparent from the following description and accompanying drawings.

BRIEF DESCRIPTION OF DRAWINGS

FIG. 1 is a partial view in schematic of a vector nozzle including a cooling ejector with the cooling extension of the ejector;

FIG. 2 is a partial view in schematic illustrating the system depicted in FIG. 1 with a variable vane mounted at the exit end of the cooling extension;

DETAILED DESCRIPTION OF THE PREFERRED EMBODIMENT

Figure 3:
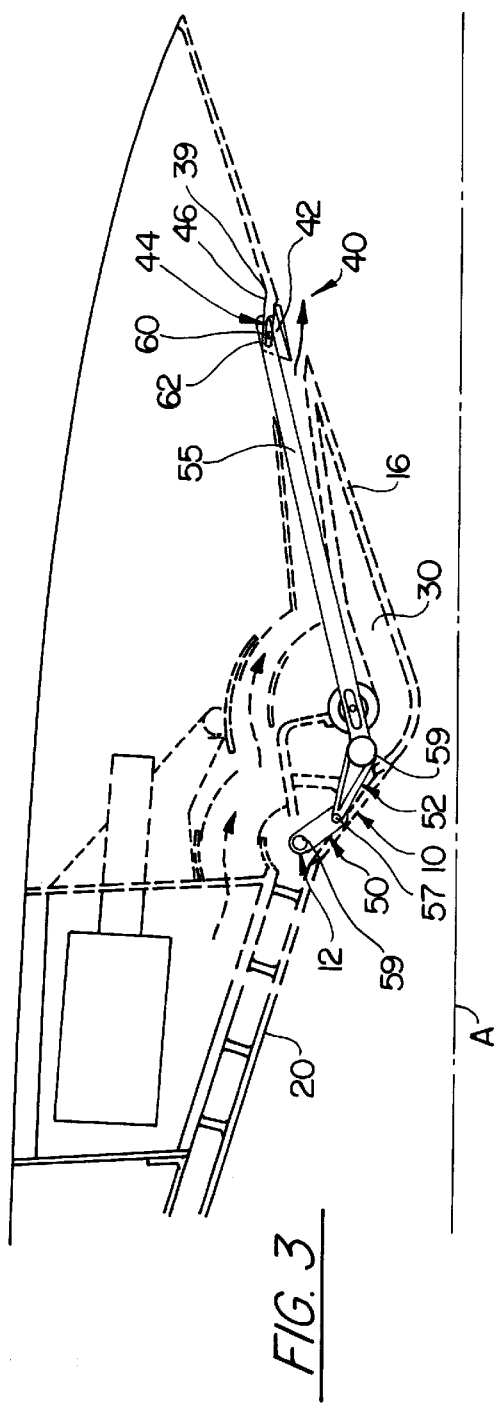
FIG. 3 is a partial view in schematic and phantom illustrating the details of the vane and the linkage for divergent flap cooling flow control.

Although the preferred embodiment of this invention is being describe as being utilized on thrust vectoring two dimensional nozzles as disclosed in U.S. Pat. Nos. 4,690,329 and 5,335,489, supra, it should be understood that the invention is applicable to other types of ejectors particularly where the ejector inlet varies because of geometric changes in the flow system as is common in many different types of exhaust nozzles for gas turbine engines. This is particularly the case where the geometry of the throat of a convergent-divergent nozzles varies.

As best seen in FIG. 1 which is a partial view of one side of a two dimensional exhaust nozzle for a gas turbine engine schematically illustrating the convergent flap 10 hingedly connected by hinge 12 to the support structure 14 and the divergent flap 16 hingedly connected to the convergent flap 10 by the hinge 18. As shown in the referenced patents an identical flap arrangement is disposed on the opposite wall symmetrically disposed about axis A which is in coincidence with the engine's axis for defining the two dimensional nozzle. The details of this two dimensional nozzle are disclosed in U.S. Pat. Nos. 5,335,489 and 4,690,329, supra and for the sake of simplicity and convenience these details are omitted herefrom and reference should be made to these patents which are incorporated herein by reference. Suffice it to say that the exhaust nozzle is capable of varying the size of the throat of the convergent-divergent nozzle and that the orientation of the flaps can be varied to direct the engine exhaust flow (gas path) in different directions so as to effectuate vectoring of the aircraft being powered by the gas turbine engine (not shown).

The convergent-divergent flaps are supported to the transition duct 20 that defines the engine's gas path leading to the flaps and disposed therein is a cooling passage 22 that flows engine fan air for convective and film cooling of the transient duct 20 and the convergent flaps 10. The remaining portion of the fan air after leaving the convergent flap 10 flows to the cooling passage defined in divergent flap 16 for convective and film cooling thereof. A typical liner that may be employed in the preferred embodiment is the cooling thin metal sheet liners of the type described and claimed in U.S. Pat. No. 5,407,133 granted to co-inventor George P. Liang on Apr. 18, 1995 entitled "Cooled Thin Metal Liner" which is commonly assigned and which is incorporated herein by reference.

As is apparent from the forgoing, the surface of the divergent flap exposed to the gas path is cooled by the fan air which is obtained from the fan of the gas turbine engine and typically routed through cooling passages formed either in the engine or through conduits mounted exterior of the engine (these elements are not shown). It is well known that the energy in the air at this juncture is at a minimum value and that ejectors of different forms are utilized to enhance the cooling of these components. Typically, but not always the discharge end of the ejector, which is driven by primary air, is disposed in the plane of the throat of the exhaust nozzle. If the flap position remained constant, this arrangement would be satisfactory. However, when the central axis of the divergent flaps and the central axis of the two dimensional nozzle are misaligned the flow characteristics of the ejector becomes distorted and adversely affects the cooling. The extension cooling concept of this invention compensates for this distortion by including an extension generally indicated by reference numeral 25 to the ejector and the divergent flap. The extension includes the walls 16, 26 and 28. Walls 16 and 26 are radially spaced relative to each other to define the passage 30 and the walls 26 and 28 are radially spaced relative to each other to define the passage 32.

As mentioned in the immediate above paragraph, the surface of the divergent flap exposed to the gas path is film cooled by the cooling air in the thin sheet metal liner that forms the wall 16. The additional cooling that is required for the nozzle relies on ejector 34. The ejector slot 21, which would otherwise discharge at the throat of the exhaust nozzle, by virtue of the extension 25, discharges downstream from the throat so that the various positions of the two dimensional nozzle 19 would have virtually no effect on the efficiency of the ejector.

As is apparent from the foregoing, the ejector 34 is in fluid communication with the ram air (secondary air) which is available in the bay of the nacelle of the aircraft. Since the ram pressure is significantly low, it would not without some other means have sufficient energy to cool the components located at the downstream end of the two dimensional nozzle adjacent to the engine's discharge. To obviate this problem, the ejector is pumped by the gas path (primary air) by virtue of the ejector slot 21 being disposed at a discrete angle relative to the direction of the flow of the gas path. This invention takes full advantage of the ejector's efficiency by locating the slot 21 at a location relative to the gas path, which pressure gradient reduces axially, to maximize the pumping effectiveness. That is to say that the secondary air stream is "matched" or significantly so, with the static pressure of the primary stream.

According to this invention extension 25 allows the low pressure ram air discharging from the ejector 34 to be discharged further downstream of the nozzle to a lower nozzle pressure region. This produces a lower slot base pressure, enhances pumping capability and reduces slot size requirement. Since the cooling air discharge pressure matches better with the mainstream static pressure at the downstream of the nozzle, the extension cooling concept minimizes turbulence mixing in between both the ram air and the gas path and yields higher film cooling effectiveness. It is thus apparent that the cooling extension concept of this invention enhances the cooling effectiveness of the ram air.

In certain installations, the cooling flowrate capability of the fixed cooling slot geometry of the ejector 34 as described in the immediate above paragraphs does not respond satisfactory to the engine nozzle's cooling demand at certain off-design points of the exhaust nozzle. For example, at maximum augmentation of the engine's augmentor (not shown), when the nozzle throat area is increased the cooling slot 21-to-exhaust nozzle's throat area ratio is reduced, resulting in a reduction of cooling flow pumping capability and film effectiveness level. This reduction in cooling effectiveness can cause the temperature to exceed the level that could adversely affect the materials of the nozzle components. This off-design problem can be alleviated by utilizing a vane disposed adjacent to the slot 21 and varying the position of the vane to change the discharge area of slot 21 as a function of the position of the convergent flap or nozzle throat area (Aj).

According to this aspect of the invention and as shown in FIG. 2 the vane assembly generally indicated by reference numeral 40 is attached to the extension 25 as utilized in an identical two dimensional nozzle application as depicted in FIG. 1 except that the wall 28 is modified to extend axially beyond the end of wall 16. In this configuration as depicted in FIG. 2, the new wall 41 extends axially beyond the wall 43 and the new slot 43 is configured to accept the vane 42.

The vane assembly 40 includes vane 42 attached to the vane support 44 which is pivotally attached to the end of the sidewall 39 by the hinge 46. As mentioned above, the vane 40 is scheduled as a function of Aj or as a function of the convergent nozzle schedule.

As shown in FIG. 3, vane assembly 40 is actuated by the position of the convergent flap 10 (like elements depicted in the drawings represent identical components) by a set of linkages which will be described in detail immediately hereinbelow. The primary linkage 50 is attached to the convergent flap hinge which provides the basic push or pull action to linkage 52 when Aj is varied. This is accomplished by attaching the end 54 of linkage 50 to the convergent hinge 12 by a suitable connection so that the linkage 50 will rotate with convergent hinge 12. Linkage 52 is pivotally connected to linkage 50 by pin 57. This motion is transmitted to linkage 55 through the U-joint 59 for moving linkage 55 rectilinearly. This rectilinear motion is converted to rotational motion by the cam slot 60 formed in vane support member 44. Follower 62 affixed to the righthand end of linkage 55 rides in slot 60 to that axial movement thereof will cause member 44 to rotate about pivot point 46 for rotation of vane 42 relative to slot 43 and hence change its area as the Aj is scheduled.

Figure 4:
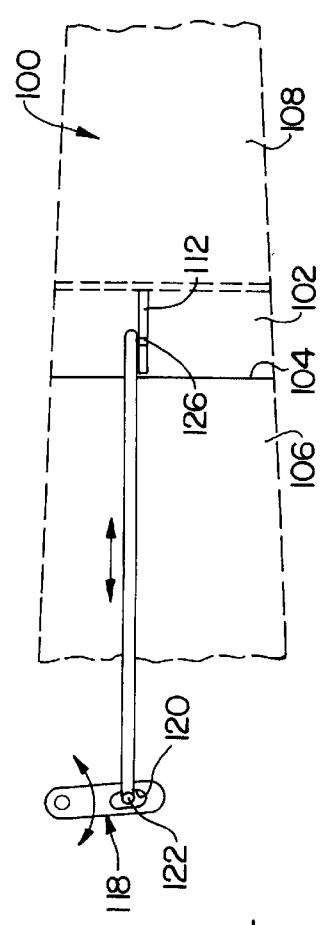
FIG. 4 is a top plan view of the sidewall cooling flow control vane.
Figure 5:
FIG. 5 is a side view of the sidewall cooling flow control vane.

FIGS. 4 and 5 depict an actuation system when the vane varies the area the ejector slot 98 mounted in the side wall 100. In this actuation system the vane 102 is disposed adjacent the slot 104 formed between the upstream sidewall portion 106 and the downstream side wall portion 108. The vane 102 is similar to the one depicted in FIG. 3 and is supported by the vane support 112 which is pivotally connected to the end of the downstream wall 108 by pin 114. The major link 116 is moved rectilinearly by the link 118 via the cam slot 120 and the follower 122. Link 118 is connected to the hinge connection 12 of the convergent nozzle as shown in FIG. 3 so that the position of link 118 is indicative of the throat area. Rotational movement of the vane 102 is obtained by the inclined cam slot 124 and the follower 126. Hence, the axial movement of link 116 rotates the vane 102 about the pivot 114 to position the vane 102 relative to the slot 98.

Figure 6:
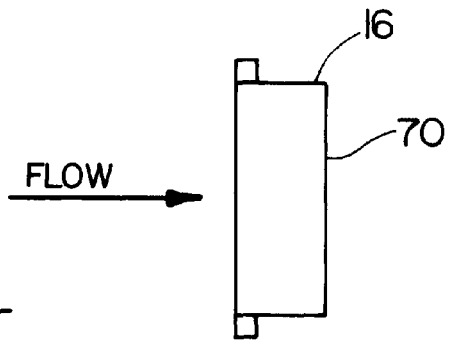
FIG. 6 is a top plan view of one embodiment of the cooling extension.
Figure 7:
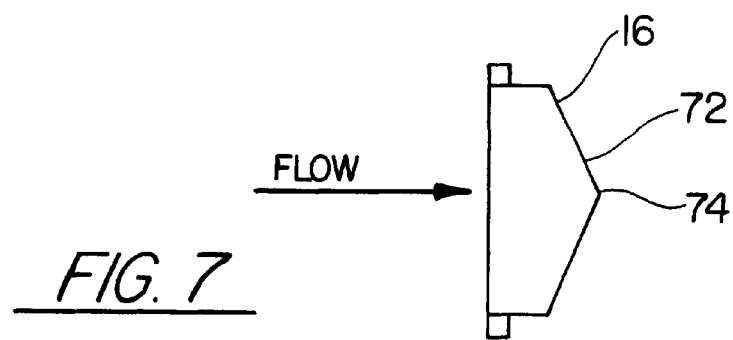
FIG. 7 is a top plan view of another embodiment of the cooling extension.
Figure 8:
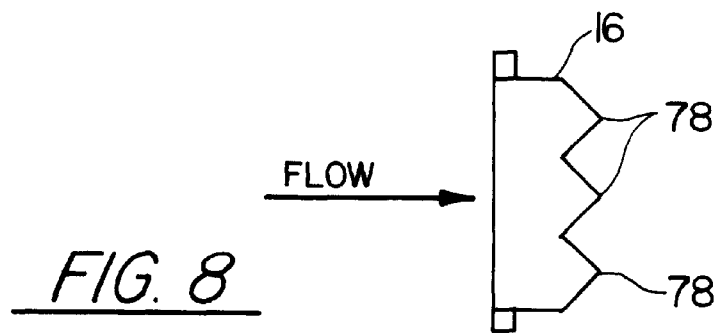
FIG. 8 is a top plan view of another embodiment of the cooling extension.
Figure 9:
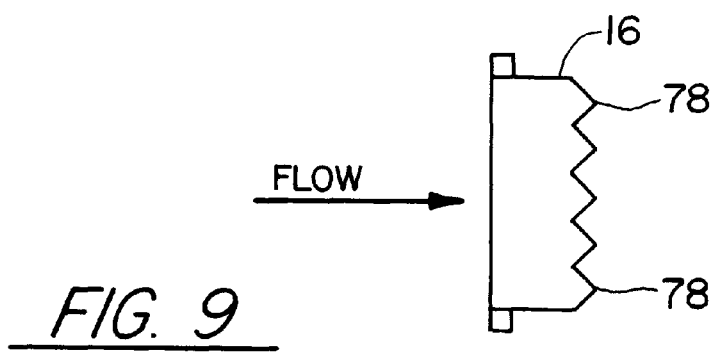
FIG. 9 is a top plan view of another embodiment of the cooling extension.

FIGS. 6–9 schematically illustrate different configurations of the end edge of the wall for avoiding infra-red detections. FIG. 6 depicts the edge 70 of the wall 16 is configured to be straight. In FIG. 7 the edge 72 is configured with a single node is depicted where the apex 74 is disposed axially downstream. FIGS. 8 and 9 are similarly configured with multi-nodes 78 all facing downstream.

What has been shown by this invention is an effective cooling of an aircraft engine's exhaust nozzle by incorporating a extension cooling concept that maximizes the cooling effectiveness of the ejector. A variable vane configuration that is positioned as a function of the nozzle throat area assures that the cooling effectiveness is not adversely affected during off-design points.

Although this invention has been shown and described with respect to detailed embodiments thereof, it will be appreciated and understood by those skilled in the art that various changes in form and detail thereof may be made without departing from the spirit and scope of the claimed invention.

It is claimed:

1. For an exhaust nozzle for a gas turbine engine comprising at least a variable positioned convergent flap and a variable positioned divergent flap defining a variable geometry throat for directing the engine's exhaust gases to discharge from the engine, the static pressure of said exhaust gases decreasing as it travels through the engine, a source of ram air and a source of fan air, means for cooling the convergent flap and the divergent flap including film cooling liner means and ejector means connecting the ram air to discharge in the exhaust gases, the improvement comprising a cooling extension downstream of said throat relative to the flow of exhaust gases having a first downstream axially extending wall, said first downstream axially extending wall having a film cooling liner adjacent to the exhaust gases, a second downstream axially extending wall radially spaced from said first downstream axially extending wall defining a first passage for leading fan air to said film cooling liner, a third downstream axially extending wall radially spaced from said second downstream axially extending wall for defining a second passage, said second passage forming a portion of said ejector means and being in fluid communication with the ram air and defining a discharge slot on the downstream end thereof, said discharge slot being axially spaced downstream of said throat and discharging the ram air from said ejector means into the exhaust gases, and the location of said discharge slot being selected to discharge the ram air into a low static pressure of the exhaust gases so that said low static pressure matches the pressure of the ram air discharging from said discharge slot.

2. For an exhaust nozzle for a gas turbine engine as claimed in claim 1 including a hinged connection connecting the convergent flap to the divergent flap at said throat.

3. For an exhaust nozzle for a gas turbine engine as claimed in claim 2 including a transition duct for leading engine exhaust gases to said convergent flap, additional hinge connection connecting said convergent flap to said transition duct.

4. For an exhaust nozzle for a gas turbine engine as claimed in claim 1 wherein said slot having a discharge edge and said edge being relatively straight and transversely disposed relative to the direction of flow of the exhaust gases.

5. For an exhaust nozzle for a gas turbine engine as claimed in claim 4 wherein said edge includes a single node extending parallel to the stream of the exhaust gases.

6. For an exhaust nozzle for a gas turbine engine as claimed in claim 5 wherein said edge includes a plurality of nodes extending in parallel to the stream of the exhaust gases.

7. For an exhaust nozzle for a gas turbine engine as claimed in claim 1 including vane means disposed adjacent to said slot for varying the area thereof, and means for actuating said vane means as a function of the geometry of the varying of the geometry of the throat.

8. A cooling system including an ejector and a cooling extension means for said ejector for cooling a two-dimensional vectoring exhaust nozzle for a gas turbine engine, said exhaust nozzle having opposing side walls and a convergent flap and a divergent flap defining a variable geometry throat for directing the engine's exhaust gases to discharge from the engine adjacent said side opposing walls, a source of ram air and a source of fan air, said cooling extension having a downstream axially extending film cooling liner adjacent to the exhaust gases, a downstream axially extending wall radially spaced from said liner wall defining a first passage for leading fan air to said film cooling liner, a second downstream axially extending wall radially spaced from said first wall for defining a second passage, said second passage forming a portion of said ejector means and being in fluid communication with the ram air and defining a discharge slot on the downstream end thereof, said discharge slot being axially spaced downstream of said throat and discharging the ram air from said ejector means into the exhaust gases, and the location of the slot being selected to discharge the ram air into a low static pressure of the exhaust gases, said static pressure matching the pressure of the ram air discharging from said discharge slot, a hinged connection connecting the convergent flap to the divergent flap at said throat, a transition duct for leading engine exhaust gases to said convergent flap, additional hinge connection connecting said convergent flap to said transition duct.

9. A cooling system as claimed in claim 8 including vane means disposed adjacent to said slot for varying the area thereof, and means for actuating said vane means as a function of the geometry of the throat.

10. A cooling system as claimed in claim 9 including linkage means interconnecting said additional hinge means and being rotated therewith and said vane means.

11. A cooling system as claimed in claim 10 wherein said linkage means includes a vane support member and camming means for positioning said vane support member, said camming means includes a follower and an inclined cam slot for converting rectilinear movement to rotary movement.

12. A cooling system as claimed in claim 11 wherein said slot having a discharge edge and said edge being relatively straight and transversely disposed relative to the direction of flow of the exhaust gases.

13. A cooling system as claimed in claim 12 wherein said edge includes a single node extending parallel to the stream of the exhaust gases.

14. A cooling system as claimed in claim 13 wherein said edge includes a plurality of nodes extending parallel to the stream of the exhaust gases.

* * * * *